(12) United States Patent
DeFrancesco et al.

(10) Patent No.: US 11,693,299 B2
(45) Date of Patent: Jul. 4, 2023

(54) CAMERA MOUNT

(71) Applicant: Components Express, Inc., Woodridge, IL (US)

(72) Inventors: Nick DeFrancesco, Woodridge, IL (US); John Berst, Chicago, IL (US)

(73) Assignee: Components Express, Inc., Woodridge, IL (US)

( * ) Notice: Subject to any disclaimer, the term of this patent is extended or adjusted under 35 U.S.C. 154(b) by 0 days.

(21) Appl. No.: 17/737,020

(22) Filed: May 5, 2022

(65) Prior Publication Data

US 2022/0260897 A1 Aug. 18, 2022

(51) Int. Cl.
| | |
|---|---|
| *F16M 11/14* | (2006.01) |
| *G03B 17/56* | (2021.01) |
| *F16M 13/02* | (2006.01) |
| *F16M 11/20* | (2006.01) |
| *F16M 11/10* | (2006.01) |

(52) U.S. Cl.
CPC ......... *G03B 17/561* (2013.01); *F16M 13/022* (2013.01); *F16M 11/10* (2013.01); *F16M 11/2014* (2013.01)

(58) Field of Classification Search
CPC ............... G03B 17/561; F16M 13/022; F16M 11/2014; F16M 13/02; F16M 11/04; F16M 11/06–10; F16M 11/12; F16M 11/121; F16M 11/123; F16M 11/18; F16M 11/2021; F16M 11/2035; F16M 2200/024; F16M 2200/04
See application file for complete search history.

(56) References Cited

U.S. PATENT DOCUMENTS

| | | | |
|---|---|---|---|
| 9,982,832 B1* | 5/2018 | Nicolas | F16M 11/2014 |
| 2019/0243218 A1* | 8/2019 | Wynalda, Jr. | G03B 17/561 |

* cited by examiner

*Primary Examiner* — Jun S Yoo
(74) *Attorney, Agent, or Firm* — Chris Tanner; FYPA PLLC (57) ABSTRACT

A mount system for machine-vision equipment that is located and used outdoors is disclosed. The mount system has a rectangular base, a lower swivel, a puck, and an upper swivel, among other parts. The lower swivel has an aperture with a conical (tapered) surface sunk into its body. This inward-facing conical aperture corresponds in size, shape, and taper with a conical (tapered) protrusion located within the upper swivel. When the mount system is fully assembled, the lower swivel is fastened to the rectangular base using the puck. When fully assembled, a tapered-head screw fastens the upper swivel to the lower swivel by matching the tapered aperture with the conical protrusion.

20 Claims, 15 Drawing Sheets

FIG. 5B (portions exaggerated for clarity)

FIG. 12 though the mount system 100 has been tightened. Similarly, if the installer finds the placement of the equipment, including the mount system 100, is not in place (e.g. moves out of alignment), the O-Ring 504 holds minute adjustments even if the installer does not begin the mount alignment procedure over.

CAMERA MOUNT

BACKGROUND

Machine-vision equipment must sometimes be located and used outdoors, in harsh conditions typically adverse machine-vision conditions, such as with farm equipment. One example is doing inspections and wash down of farm equipment used with e.g. hog farms and livestock, the animals and equipment are outside of any controlled environment. Yet, these valuable assets must still be watched and inventoried using machine-vision equipment.

Another environment adverse for machine vision is machine-vision images of a coastline. In such an environment, machine vision cameras may be mounted outdoors, observing coastline, observing waves, observing the sky, but sitting outdoors for once and months and months without touching any of it.

With all these outside conditions, temperature and humidity variations, the settings on the mounts for the machine vision cameras can back out, work loose, fall out. Consequently, an improved mount that can withstand outside conditions is desired.

DETAILED DESCRIPTION OF THE DRAWINGS

DETAILED DESCRIPTION OF THE PREFERRED EMBODIMENTS

Figure 1:
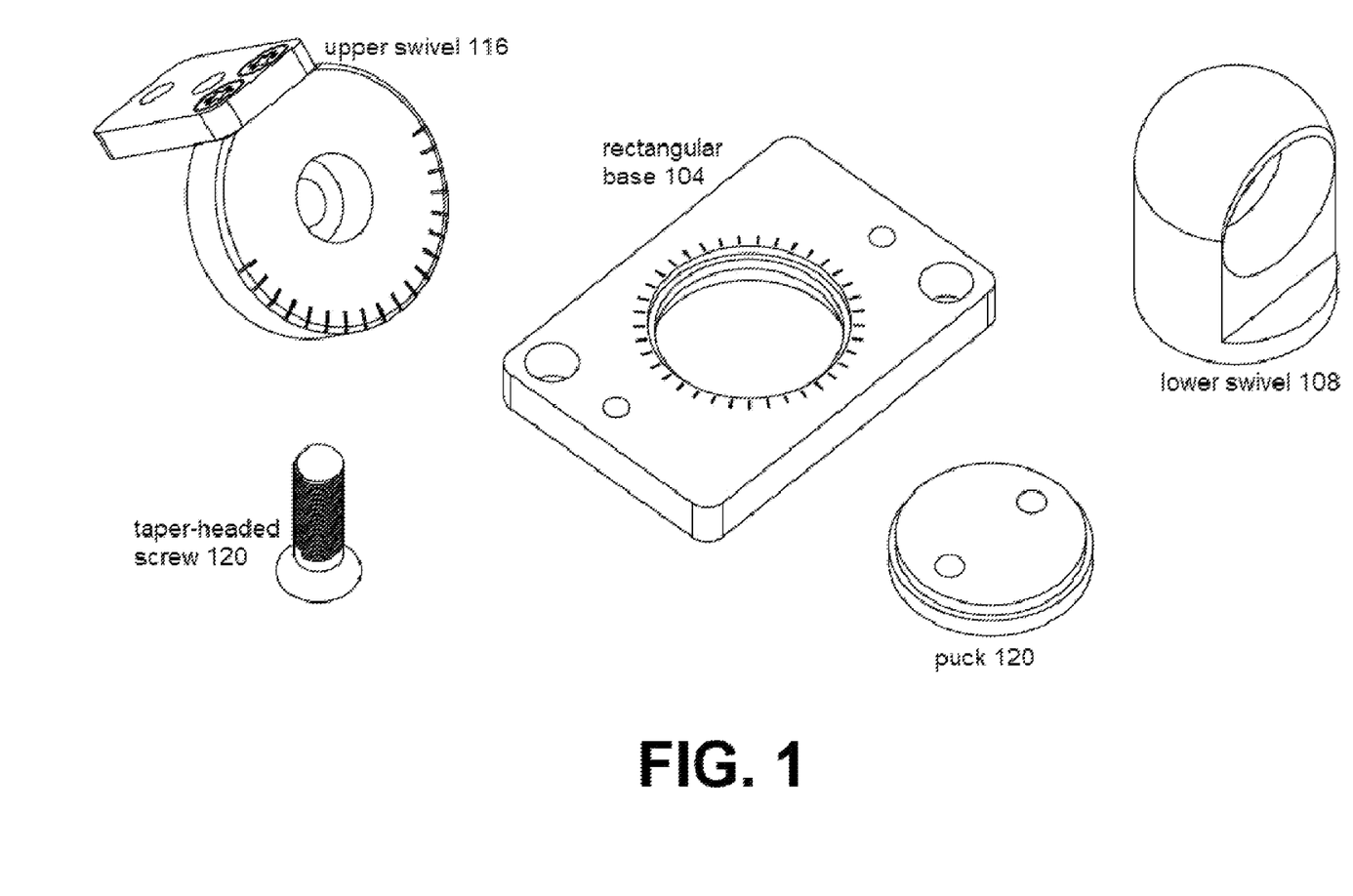
FIG. 1 shows a mount system.

FIG. 1 shows a mount system 100 in a non-assembled arrangement, comprising a rectangular base 104, a lower swivel 108, a puck 112, and an upper swivel 116. The lower swivel 108 has an aperture with a conical (tapered) surface 109 sunk into its body. This inward-facing conical aperture 109 is intended to correspond in size, shape, and taper with a conical (tapered) protrusion 117 located within the upper swivel 116.

When the mount system 100 is fully assembled, the lower swivel 108 is fastened to the rectangular base 104 using the puck 112. When fully assembled, a tapered-head screw 120 fastens the upper swivel 116 to the lower swivel 108 by matching the tapered aperture 109 with the conical protrusion 117.

The system 100 uses the two separate tapered surfaces, specifically the matching tapers 109/117, and the taper within the screw 120. Such tapering is important is because it provides more contact area which in turn provides more mechanical strength. This in turn leads to resistance to movement, and resistance to "backing out" (unwanted slippage). The combination of tapered elements 109/117 is for tightening yet still permitting some movement of the mount system 100, while the taper-headed screw 120 is more for completely locking down the mount system 100.

Figure 2A:
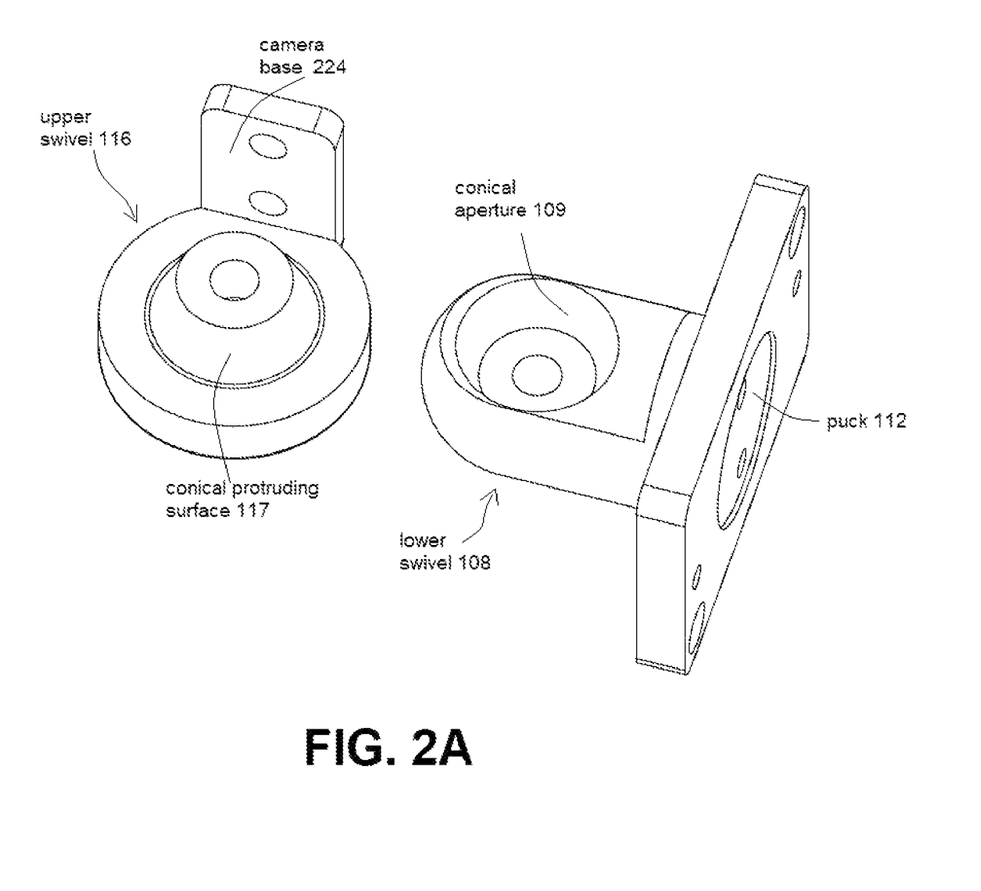
FIGS. 2A, 2B, and 3 show more detail of the mount system of FIG. 1.
Figure 2B:
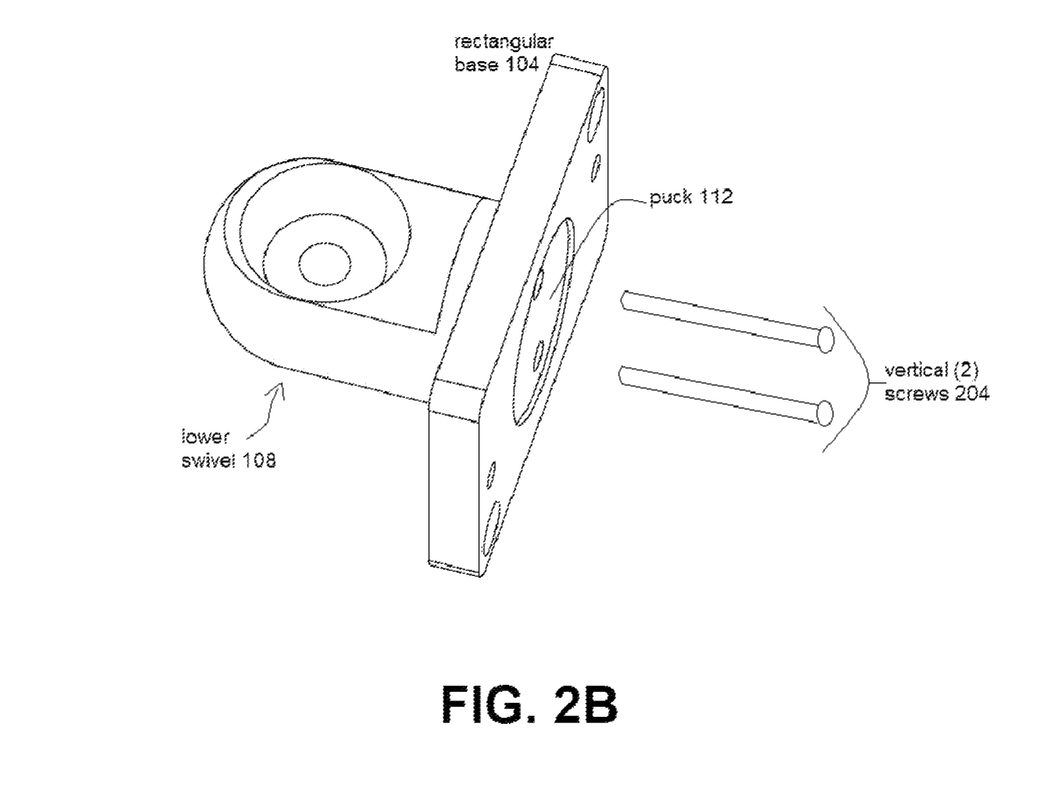
Figure 3:
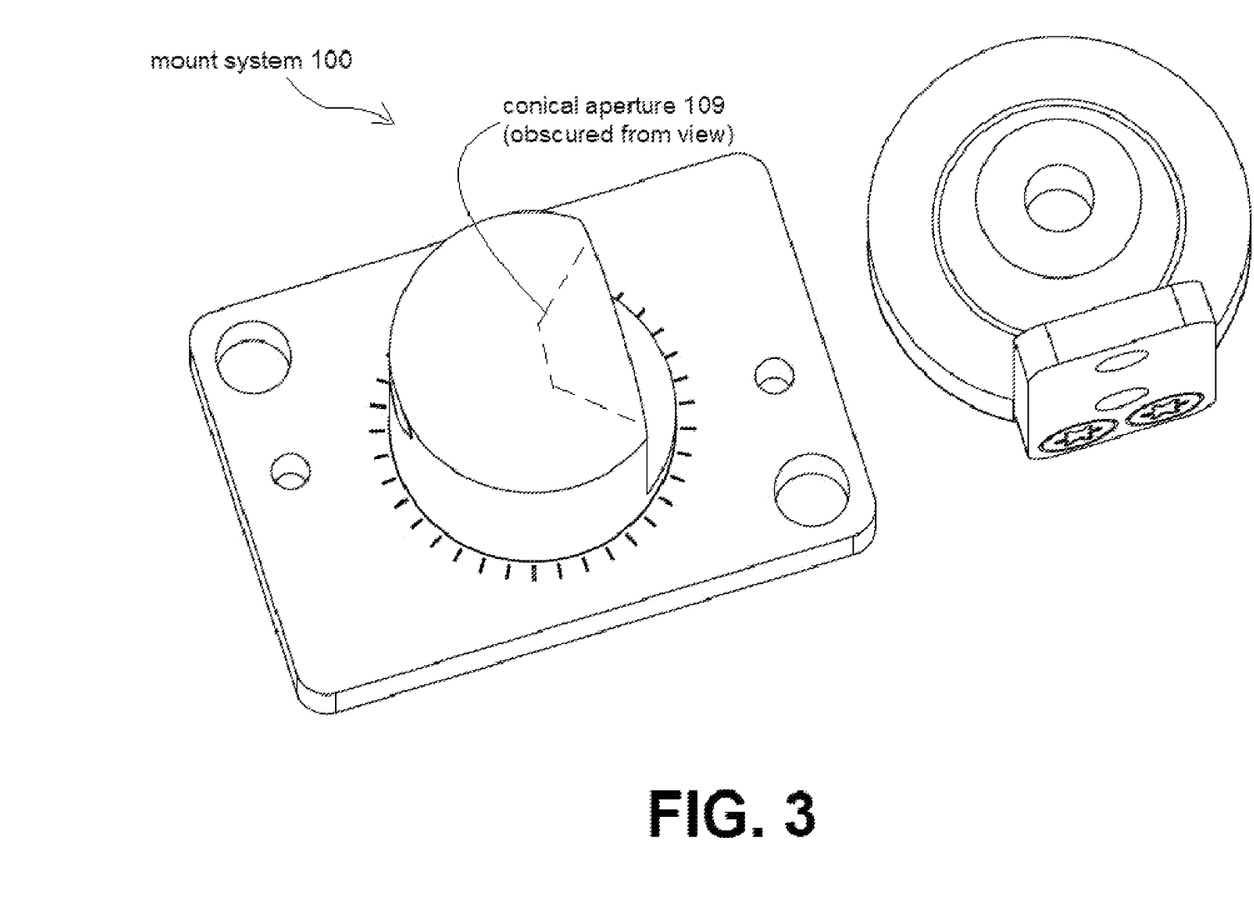

FIGS. 2A-2B and 3 show more detail of the mount system of FIG. 1. FIGS. 2A-2B-3 show the conical tapered protrusion 117 and the tapered aperture 109. During use, an installer\user rotates the upper swivel 116 within the lower swivel 108, at which time the two matching tapered surfaces 109/117 engage with each other.

One way to get more contact surface can by making the whole mount larger, which may not be feasible for the various mounting environments contemplated herein. Consequently, the system 100 is designed with slightly tapered angles so as to increase a contact-surface yet avoid making the overall unit be unreasonably large. The tapered surfaces 109 and 117 are examples of this, in that they distribute more force across the entire mount system 100 than conventional non-tapered (flat) surfaces. The combination of surfaces 109/117 relies on the taper headed screw 120.

During rotation of the upper swivel 116 within the lower swivel 108, when the upper swivel 116 is attached but is still somewhat loose, some resistance remains, but enough to hold position. The upper swivel 116 doesn't fall out or won't fall or back out (work loose). As long as the taper-headed screw 120 is in-place but not fully tightened, the upper swivel 116 will move just a bit, although with difficulty.

FIG. 2B shows how two vertical bolts 204 engage the lower swivel 108 into the mount system 100 through the puck 112. The mount system 100 is optimized for maximizing fastening strength in the vertical direction. Strength in the vertical direction means the other fastening torques and securing mechanisms within the mount system 100 are also more likely to stay in place. FIG. 3 shows, among other things, a top view of the lower swivel 108, with its interior conical tapered aperture 109 shown in hidden lines, being obscured from view.

Figure 4:
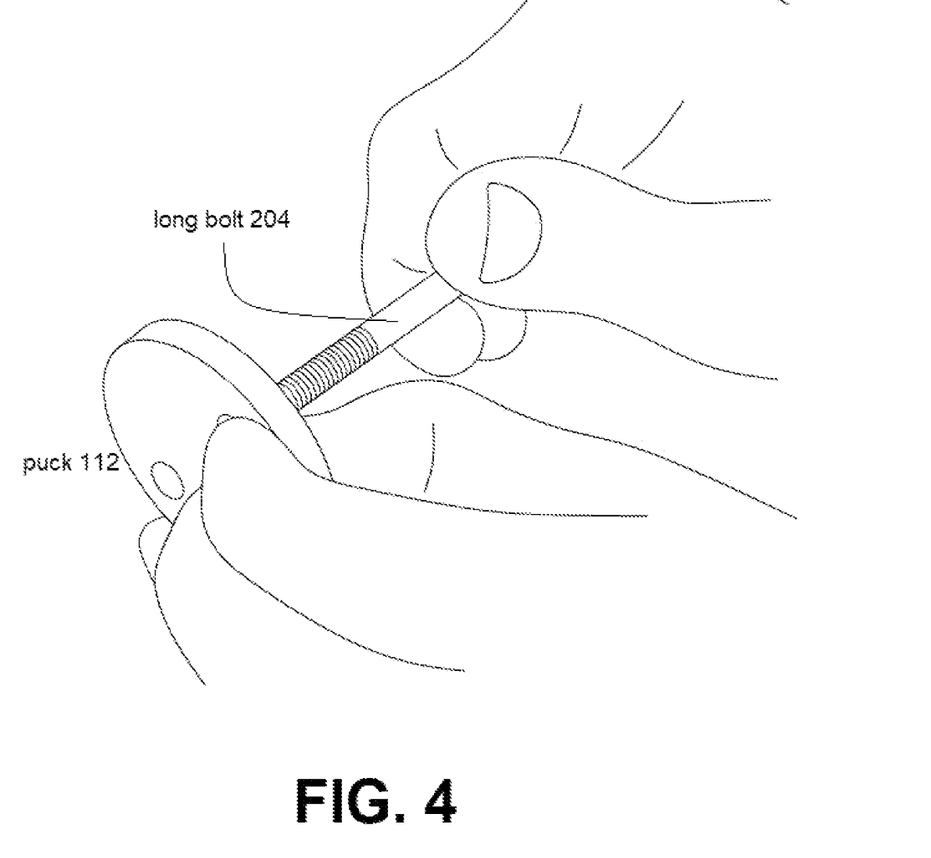
FIG. 4 shows a puck that is part of the mount system.

FIG. 4 shows the puck 112 having one of the long vertical bolts 204 located therein, shown outside of their normal usage so as to convey a visual point. Other apertures within mounts may have only four threads of engagement, which can be limiting, lead to stripping (the bad kind), loosening, and "backing out". Meanwhile, the puck 112 has sufficient thickness to accommodate e.g. eight threads. Eight threads of engagement facilitate purchase and mount-stability.

Figure 5A:
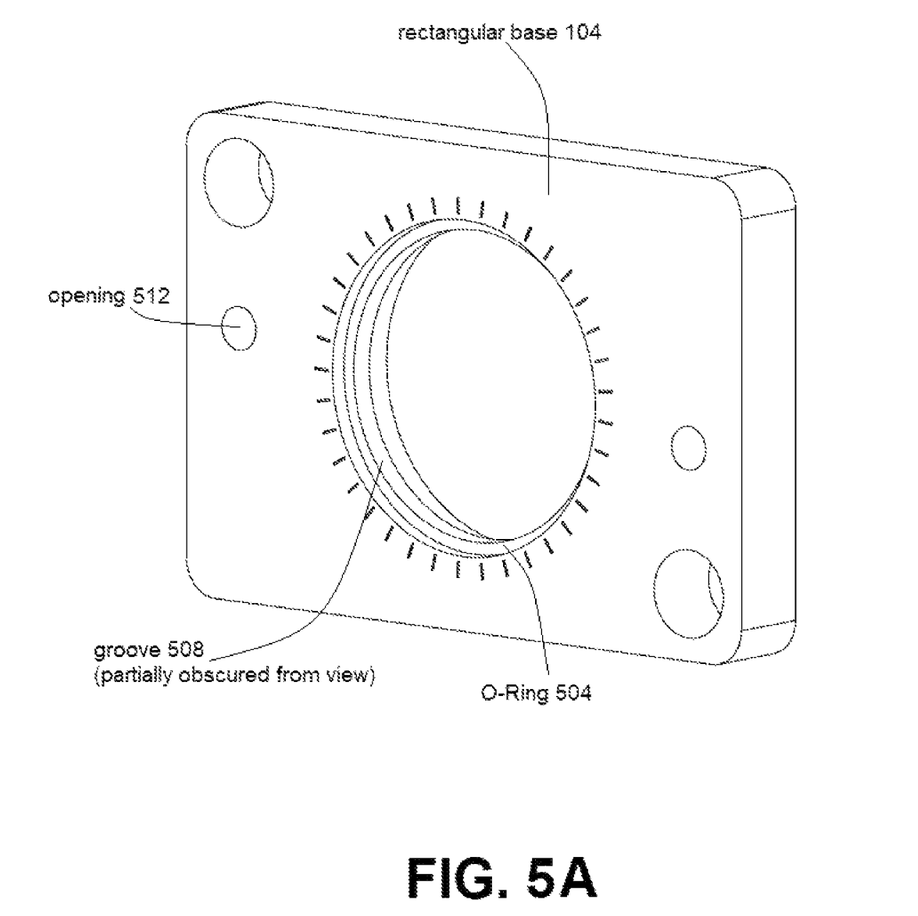
FIG. 5A shows an O-Ring located in a rectangular base that is part of the mount system.

FIG. 5A shows an O-Ring 504 located on an inside surface (groove) 508 of the rectangular base 104. While not apparent from FIG. 5A, the groove 508 may be round or may have a tapered cross-section. Again, the embodiments herein strive to achieve a tradeoff of increased gripping surface v. more universality of use. If the O-Ring 504 wasn't present, even when the lower swivel 108 is tightened down, a user could still move it pretty easily. With the O-Ring 504 designed into place, the mount system 100 requires bit of force to move the lower swivel 108. Because the rubber O-Ring 504 is installed. one can tighten the lower swivel 108 just a little bit just by barely fingering it, as the O-Ring 504 holds the minute adjustments. Accordingly, the mount system 100 achieves much finer adjustment than other embodiments, and does without losing its settings. That is, if an installer's fingers slip off the mount system 100 during adjustment, that installer does not need to start completely over.

Figure 6:
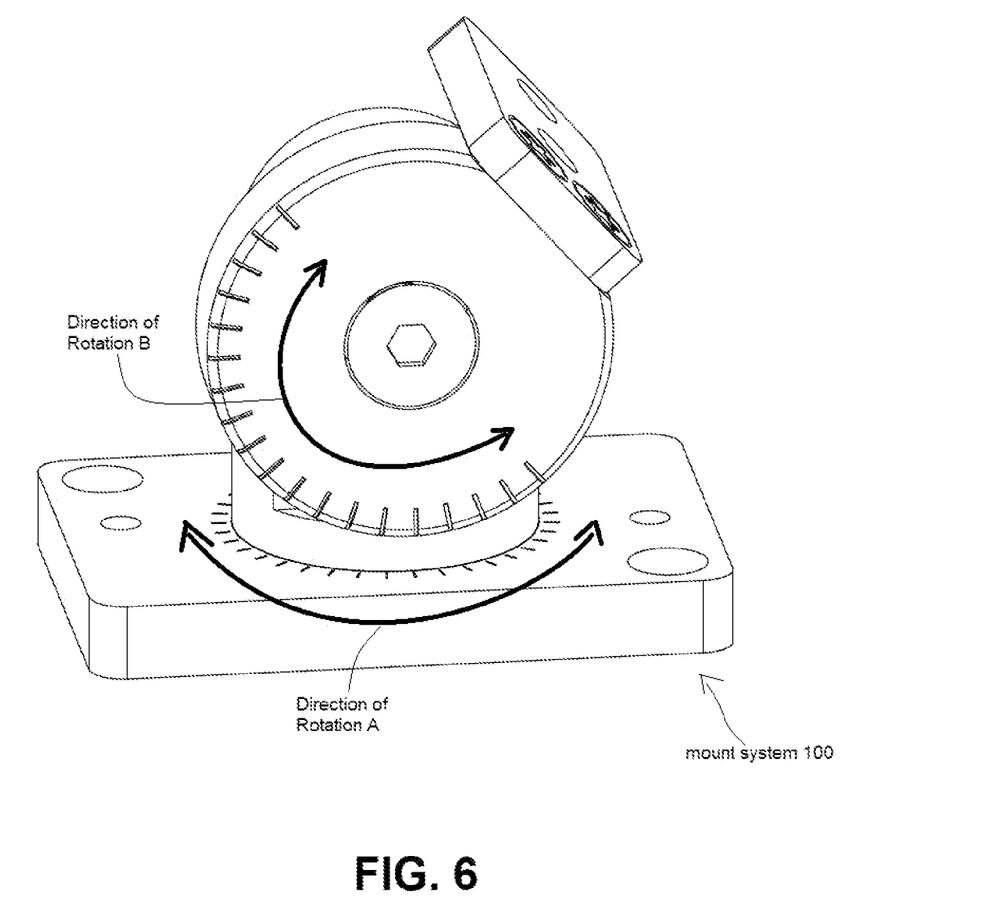
FIGS. 6 and 7A show the mount system fully-assembled, but not having any camera devices attached, and not being mounted on any specific surface.

FIGS. 1 and 6, among others, show how the system 100 is wide enough to support visible numbering and markings (e.g. degree-markings). A user/installer can see an angle of position with good clarity and visibility, going from zero to 90 degrees, with a visible mark every 10 degrees. Even finer marks, e.g. five degree marks, are contemplated within the spirit and scope of the embodiments herein. This depends on how cluttered the visibility becomes, because these pieces are very small and too much marking information in a small space could be counter-productive. Customers may want the adjustability finer, and the markings finer, but there is a limit.

Figure 7A:
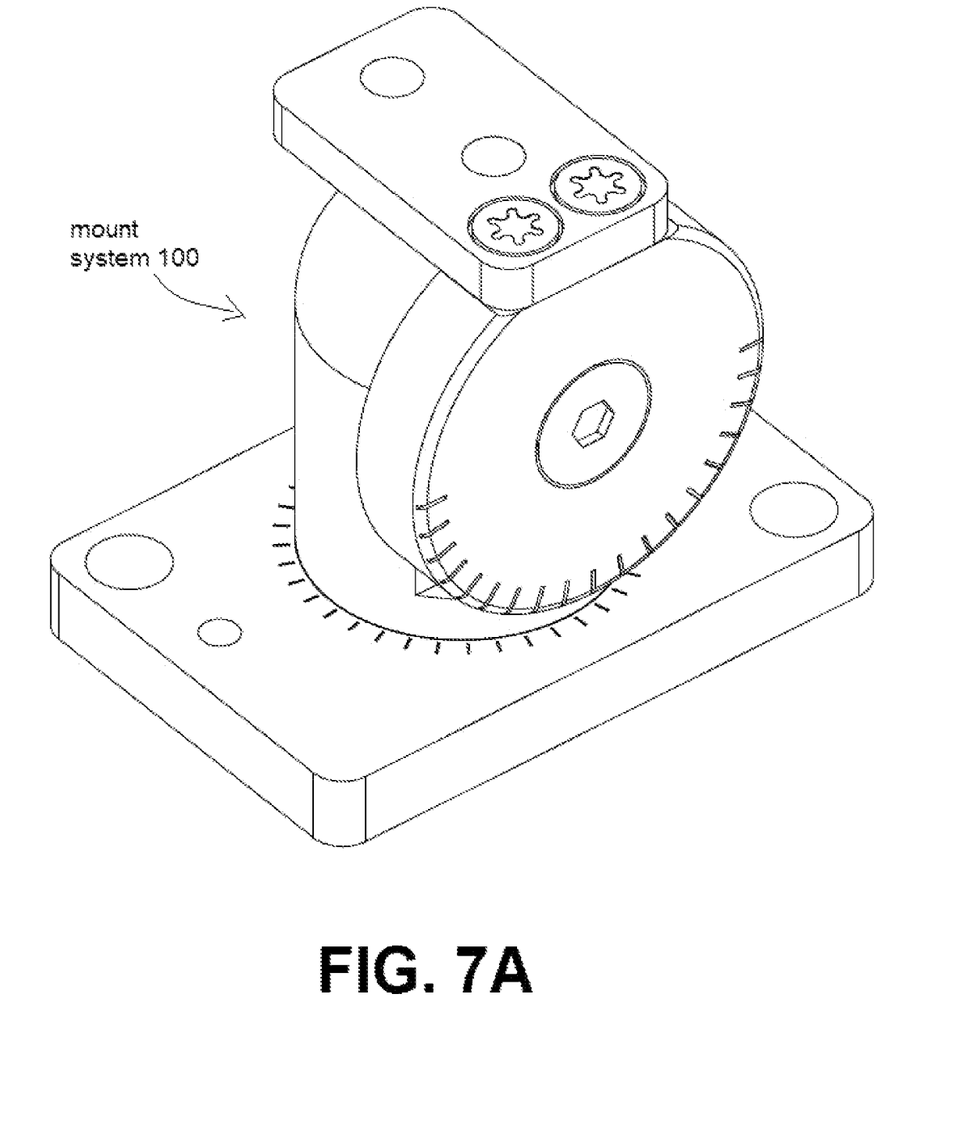
Figure 7B:
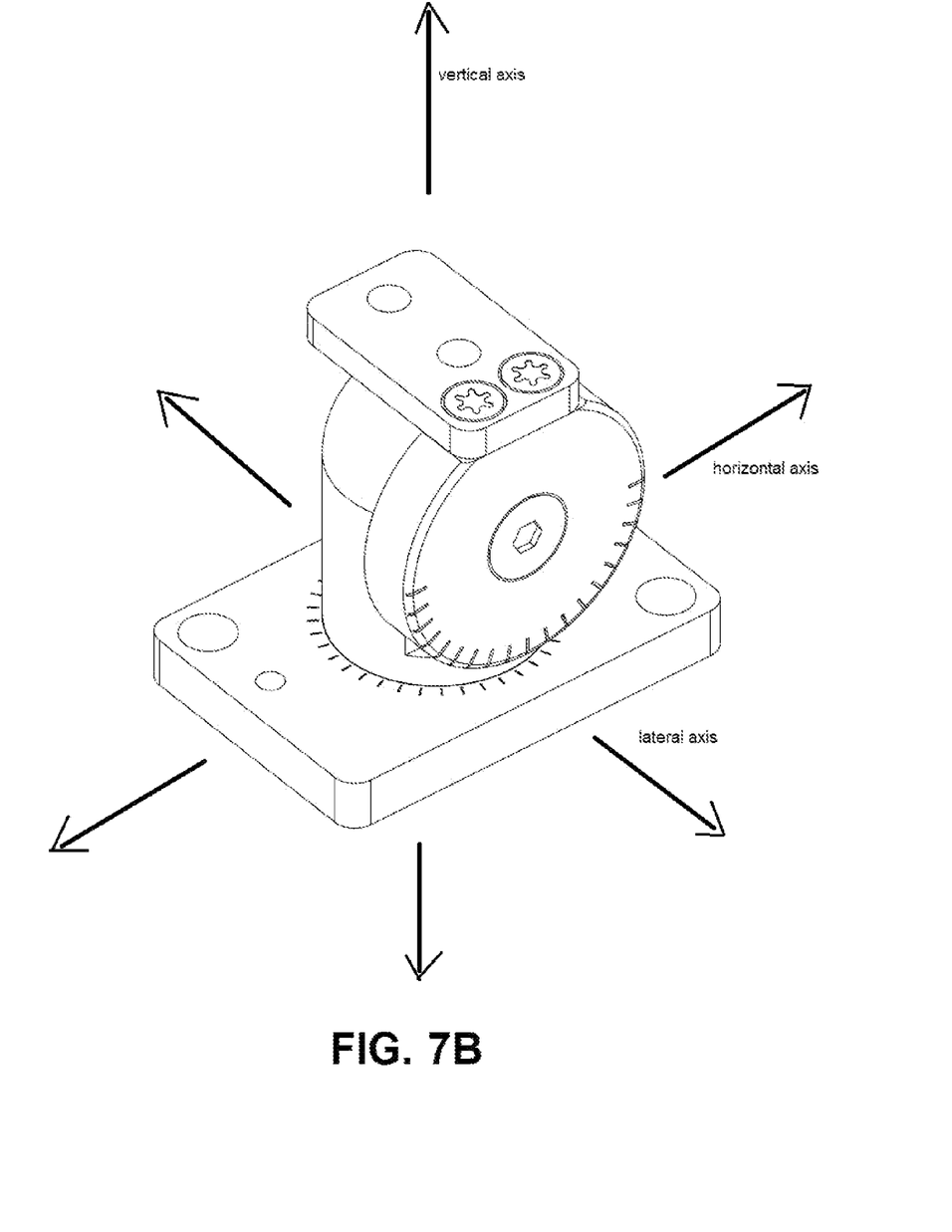
FIG. 7B show a zero-offset feature of the mount system.

The vertical fastening bolts 204 limit the rotation on the vertical axis (FIG. 7B). The vertical fastening bolts 204 (FIG. 2A) are made from stainless hardware. The present embodiments employ all stainless hardware for the entire mount system 100. Embodiments herein went over to all stainless hardware per requests from customers with outdoor applications.

Non-stainless steel is prone to rust, thus not suitable for long-term outdoor use. Stainless costs a third or two thirds more, and one also loses a bit of strength when using stainless. That's why everything in the mount system 100 may be somewhat bigger than conventional mounts. Doing so allows stainless usage yet not surrender strength or durability.

Outdoor environments results in expansion and contraction, A mount can back off (slip out of position) with temperature changes, because of expansion and contraction. However, using stainless components, such expansion/contraction is reduced.

If an end-purchaser wanted a permanent solution, they could lock the lower/upper swivels 108/116 using glue, e.g. Loc-Tite. After setting it and leave it for about 30 minutes, the whole mount system 100 will be usable outside.

All aluminum used in manufacturing the mount system 100 expands and contracts at an equal rate, as all are composed of the same material. Further, in general, stainless steel has less expansion/contraction than aluminum. During fabrication and testing of the mount system 100, various prototypes are run through an environmental test chamber to verify behavior. A considerable amount of testing via a temperature-varying environmental test chamber helps to verify temperature tolerance and optimal behavior in outdoor conditions.

FIGS. 6 and 7A-7B show the mount system fully-assembled, but not having any camera devices attached, and not being mounted on any specific surface. From FIG. 6 it is apparent that the mount system 100 provides two separate degrees of freedom, facilitating two separate rotation-paths A and B (FIG. 7B) each having 360 degrees of rotation.

Combining FIG. 6 with FIG. 7B, the upper swivel 116 rotates in direction B (FIG. 6) about the lateral axis (FIG. 7B). Meanwhile, the lower swivel 108 rotates in direction A (FIG. 6) about the vertical axis (FIG. 7B). The embodiments herein achieve this by use of the beefier and more durable rectangular base 104. The customers are requesting this because they are having back-out issues if the mount system 100 doesn't have enough strength and thickness.

As stated, the mount system 100 will be located outside, and must withstand harsher environmental outdoor conditions. In typical outdoor conditions, a typical cause of loosening (backing out) is not torque on the mount system 100 itself, instead the backing out is more from expansion/contraction due to temperature.

Metric v. English

Using a metric piece of hardware, a countersunk angle within e.g. the rectangular base 104 may be set at 90 degrees. With English hardware, one might use a 4-20 screw, which is pretty close to Metric M-6, which angle is 82 degrees. Because 90!=82, without some accommodation, a purchaser of a conventional mount could not interchange hardware. So the mount system 100 makes accommodations at the small cost of a slight reduction in mechanical strength.

One such accommodation can be changing the screw to be just a flat-head, which is not as strong of a securing mechanism. For example, a user can take M-6 (metric) hardware and do the securing, or apply 4-20 (English) hardware and they both fit into the same hole. This is an advantage of using flat-head screws rather than tapered-head screws. The mount system 100 thus achieves universal hardware whether Metric or English.

A contact angle becomes larger as a taper angle gets larger. It is true that the taper-head screws achieve more holding power than the flat-head, which in turn reduces backing out.

FIG. 5A shows openings 512 which are not tapered openings, instead in FIG. 5 they are just counter-sunk. The mount system 100 can use tapered openings 512 also, but this results in a different type of screws used for fastening (as described earlier). Customer preference e.g. English or Metric will dictate which choice of the mount system 100 will be manufactured in higher volume.

These choices are made based on what was more important for holding power. In outdoor environments holding power may not be as critical for the customer. Some customers may not have backout (eventual loosening) issues with their mounts located outdoors. They can readily use a glue (e.g. Lok-Tite) strong enough hold but in a pinch, but where that customer/user can still break loose the installation if necessary.

The mount system 100 achieves higher holding power for both directional axes A and B (FIG. 6). Doing so involves relying on the two vertical screws 204 (FIG. 2B). As such, the mount system 100 is optimized for vertical strength.

Stainless hardware is typically weaker than the steel hardware and can be twisted so much that it will strip itself. Thus, the embodiments go to a bigger hardware size versus conventional. The mount system 100 strives to achieve the same hex-key drivers as for existing mounts, and striving to avoid forcing customers to buy new tools and parts. It's better for the customers to have less tools to stock, less pieces to look for on their key sets.

Packaging

During packaging and shipping of a completed (unassembled) version of the mount system 100 to a potential customer, typically all screws go into a bag and the O-Ring 504 goes into the same bag. Sometimes when parts go into the bag, they get crushed sideways and later these parts don't fit right (at first). It doesn't really affect the performance, but it makes it more difficult on the customers sorting all this out.

To address this problem, the embodiments herein avoid having the O-Ring 504 in a separate bag. Instead, it's better to package the rectangular base 104 in the packaging with the O-Ring 504 already present and in-position.

Figure 5B:
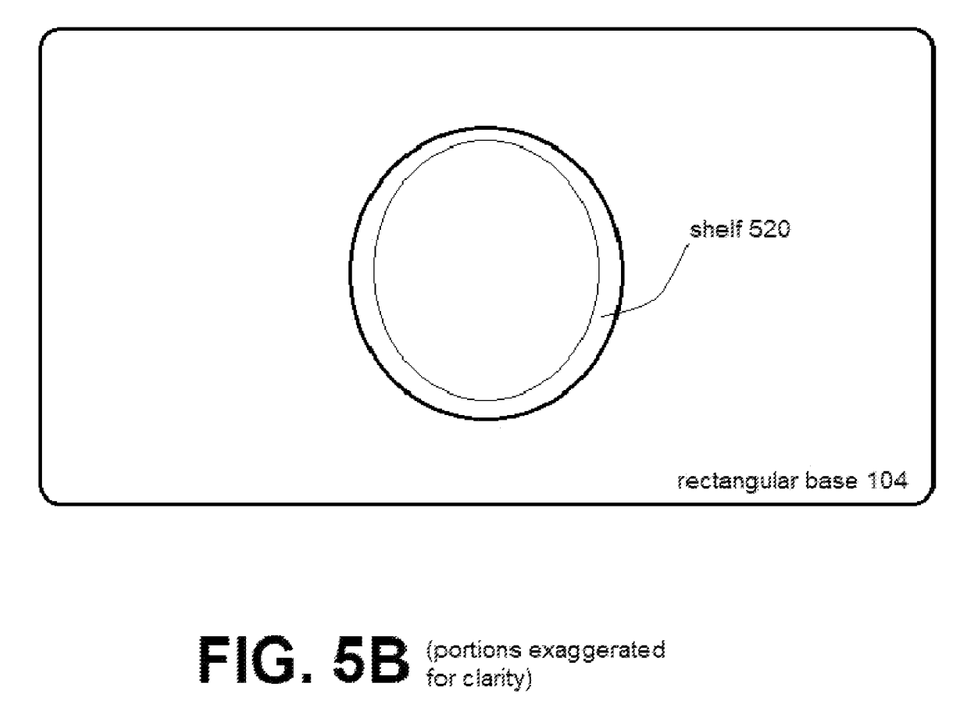
FIG. 5B shows a flat shelf surface within the rectangular base.

Additionally, the rectangular base 104 has a lot of contact area, as shown in FIG. 5B. FIG. 5B shows portions that are exaggerated for clarity, but the point is that lots of flat (shelf) surface 520 exists within the rectangular base 104. The shelf 520 facilitates providing additional downward pressure from the lower swivel 108. All this contact surface yields extra holding power in the vertical direction (FIG. 7B). Remember, the O-Ring 504 is located within a lateral gap 508, not the shelf 520 (FIG. 5B), of the rectangular base 104.

Installation and Adjustability

Customers gain an advantage by having the ability to tighten the mount system 100 and yet still have the ability to adjust by e.g. one degree and not have to loosen fasteners to do so. In trying to move either swivel 108/116 only one degree or so, an installer would want a bit of resistance. Otherwise the lower swivel 108 just free-spins (comes loose) so that installers lose any setting that was arrived at during their initial set up.

Next, when users/installers tighten the various elements of the mount system 100, they can use a torque driver. The torque driver allows for process repeatability and less training for the assemblers.

Of course, the mount, system 100 can be hand-tightened sufficient training, or torqued to a spec with minimal training. Use of a torque driver, not a mere hex key, can be important. This is good for training, and also for preventing stripping of threads, preventing breakdown of the raw materials within the system 100.

A manufacturer can set a specification for degree of desired tightness all the connections, as over-tightening could damage threads within any of the rectangular base 104, the puck 112, the lower swivel member 108, by stripping out the various threads.

Next, when users/installers tighten all these things now, they can use a torque driver. The torque driver allows for process repeatability and less training for the people assembling the mount system 100.

Figure 8:
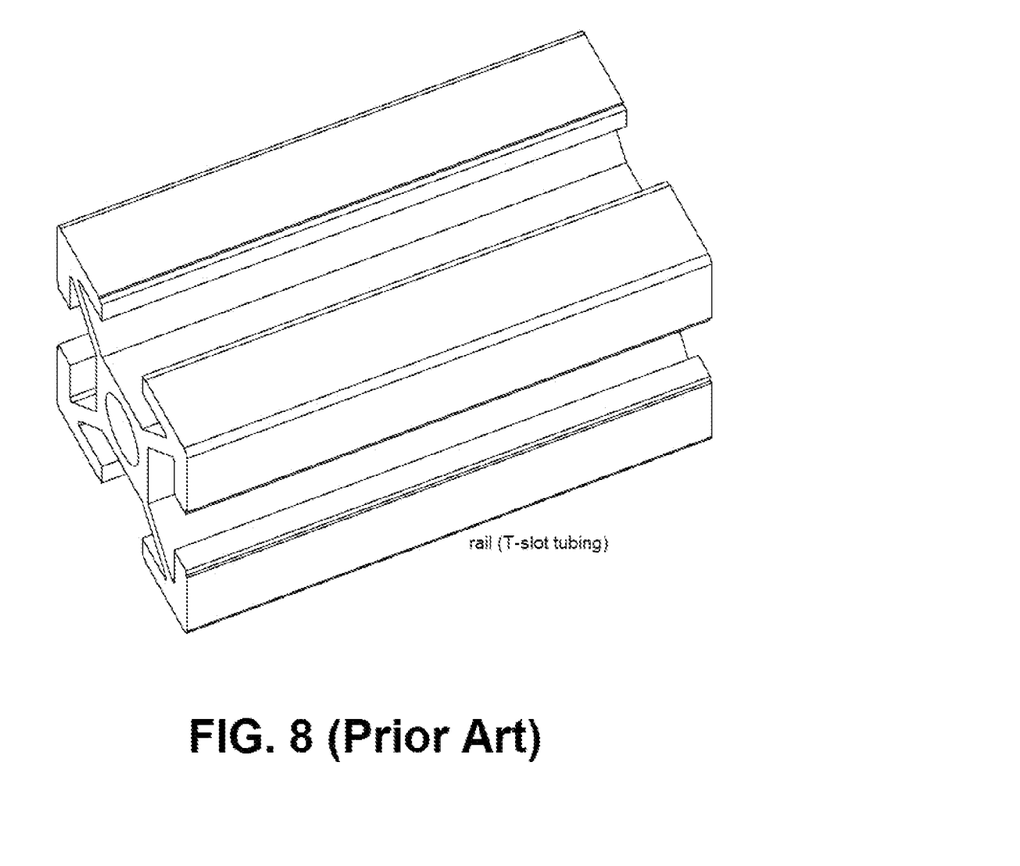
FIG. 8 (Prior Art) shows a rail-section of conventional T-slot tubing.
Figure 9:
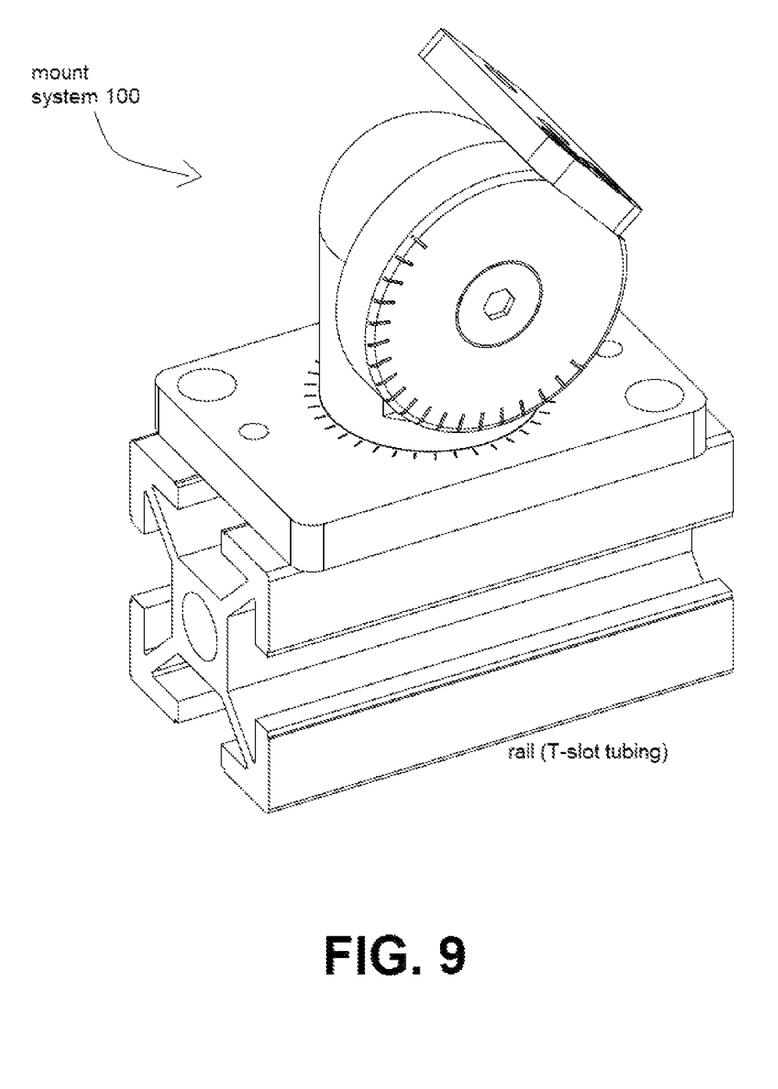
FIG. 9 shows the mount system attached to the rail-section of FIG. 8.

FIG. 8 (Prior Art) shows a rail-section of conventional T-slot tubing. FIG. 9 shows the mount system attached to the rail-section of FIG. 8. From FIG. 9 it should be apparent that the mount system 100 extends over the edge of the T-slot tubing. However, this does not cause a critical problem because of the zero-offset properties of the mount system 100. Full readability of all markings on the mount system 100 is still maintained, even though the mount system 100 hangs over the edges of the T-slot tubing to do so. The readability advantage is worth the minor tradeoff or disadvantage of the hanging over the edges.

Locating the mount system 100 on the rail (T-slot tubing from FIGS. 8-9) is not a problem, despite the overhang. In conventional mounts, these markings are cut off leaving a user\installer to be guessing at some edges. Meanwhile, with the mount system 100, the markings go all the way around, zero to 360. That full-marking was more important than the slight loss of strength in holding to the rail.

Another issue regarding installation and adjustability is something called zero-offset (on-center) manufacturing. FIG. 7B show a zero-offset feature of the mount system 100. Specifically, the mount system 100 is manufactured to be on-center at the intersection of the horizontal and lateral axes (FIG. 7B). The center of the rotation is also the center of the tilting. That's a significant advantage, useful for remembering a specific position. Useful for rotating on a first axis but without losing any settings on a second axis.

The embodiments of the system 100 are always zero-offset, and actually rotate about the intersection of the horizontal and lateral axes (FIG. 7B). This is advantageous because an off-center mount is more difficult to re-adjust. If an off-center mount loses its position, restoring it back to its proper settings can require time-consuming adjustments, and longer human intervention as well as perhaps electronically sighting directly though the machine vision camera itself.

The mount system is manufactured have zero offset from the horizontal axis and the lateral axis of the rectangular base. This in turn assures that a center of rotation of the lower swivel is also a center of tilting of the upper swivel. Such a zero-offset (on-center) nature of the mount system 100 means it can be more quickly restored back to its proper position, just by obeying the markings engraved and anodized therein. During such a restoration of position, the specific machine vision camera being mounted can itself be entirely off, disabled, not involved in the mounting process. Instead, the on-center markings of the system 100 facilitate an installer merely "eye-balling" the install-process.

Other companies do not manufacture using zero-offset, as doing so is difficult for manufacturing. Manufacturing with zero-offset allows repeatability in all directions rather than forcing a positional change, in addition to rotational change, every time the mount system 100 is adjusted.

Think of a merry-go-round as a rotating disc. If one stands on the edge of the merry-go-round disc, during rotation that person also moves positionally in addition to changing their rotation angle. Meanwhile, with manufacturing the mount to have zero-offset (on-center), if something is located in the center of the disc, during rotation they are only rotating, but have not moved positionally. Manufacturing the mount system 100 to have zero-offset is an example of seeking to control one position variable at a time.

Assembly: Anticipating Problems

Figure 10:
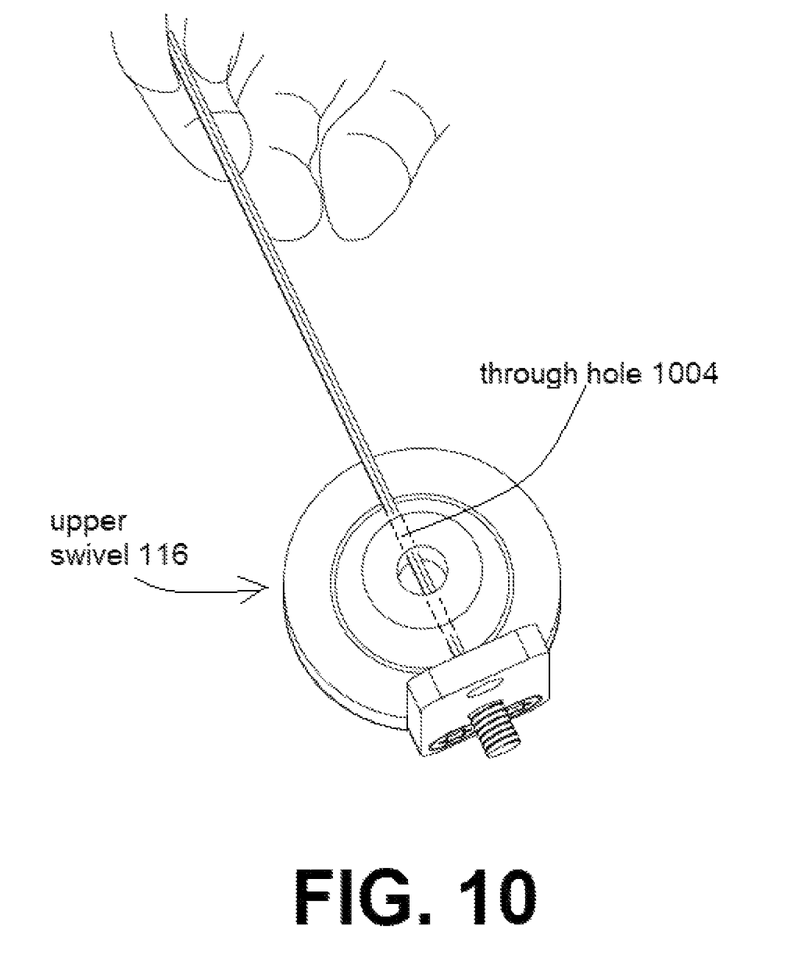
FIGS. 10 and 11 show an advantageous accommodation achieved by the mount system.
Figure 11:
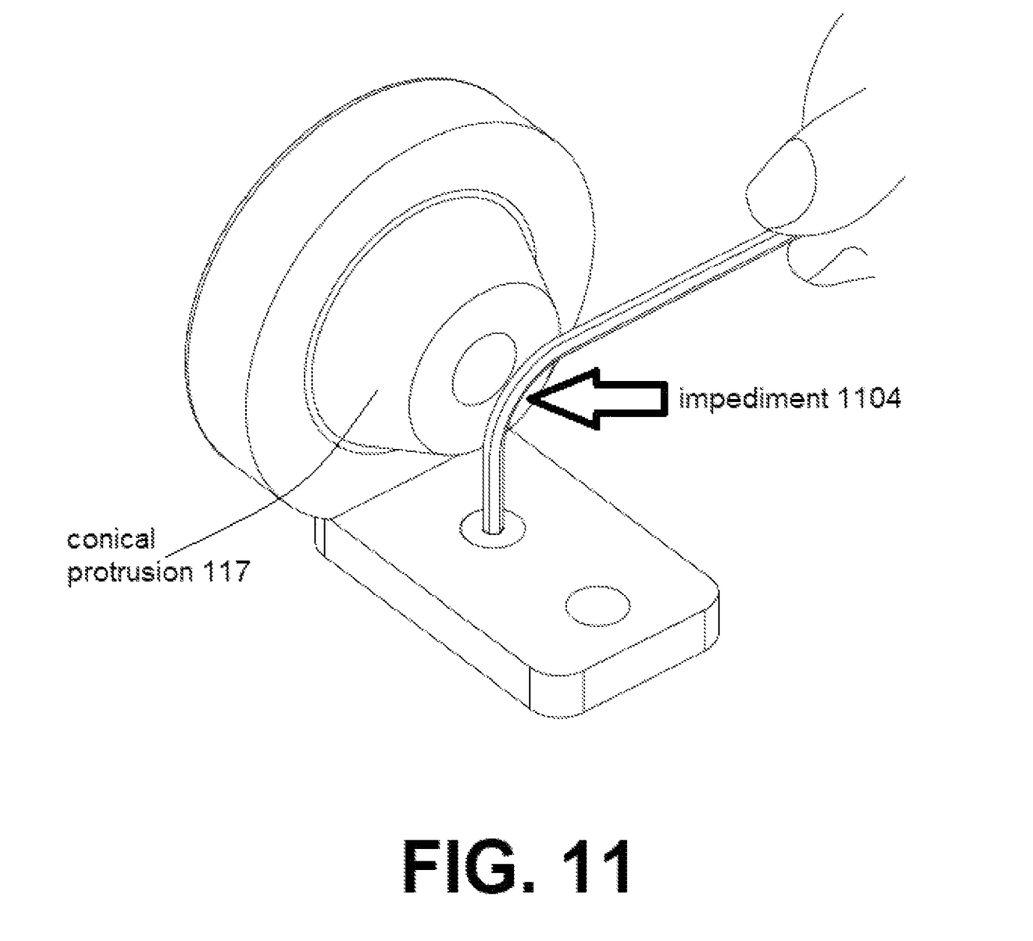

FIGS. 10 and 11 show an advantageous accommodation achieved by the mount system 100. Specifically, FIG. 11 shows how the conical tapered protrusion 117 can impede adjustment of the camera base 224 (using the example of the impediment 1104). To address this, FIG. 10 an optional through-hole 1004 to overcome this problem.

Because most people's instincts are to assemble the mount system 100 a certain way, unfortunately this can be an erroneous way. A new and unfamiliar assembler of the system 100 may not discover this said fact until very deep into an assembly process. Experiments showed that installers typically unscrew this camera base 224 and detach from the upper swivel 116, screw in the actual camera onto the camera base 224, and then <attempt to> screw the camera base 224 back on. But as shown in FIGS. 10-11, an important set of screws within the camera base 224 are covered or obscured by the conical protrusion 117. A hex-wrench having a ball at its tip, instead of mere straight surface at its tip, can be helpful. The ball-end hex key can be operated in a non-perpendicular position. Another option is using the optional through-hole 1004 (FIG. 10).

Figure 12:
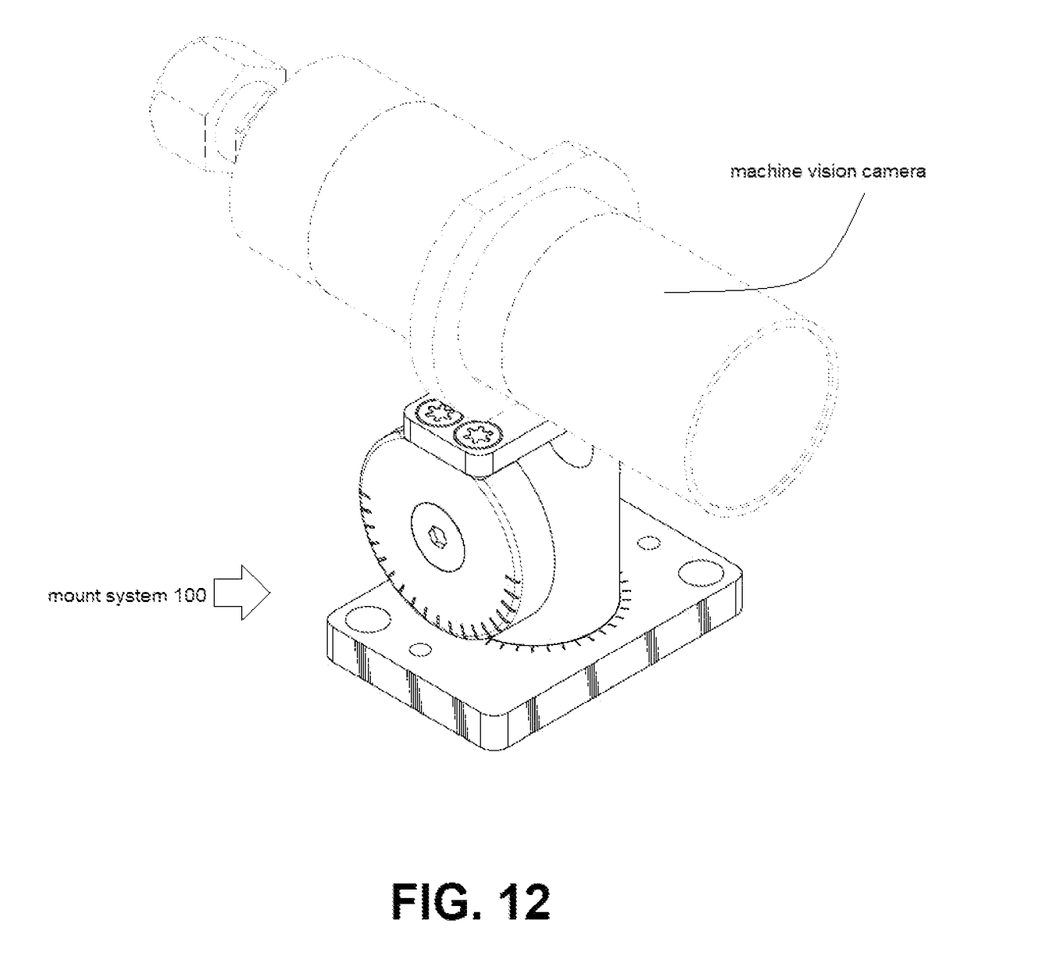
FIG. 12 shows the mount system with a machine vision camera attached.

FIG. 12 shows the mount system 100 with a machine vision camera attached. The machine vision camera is shown in dashed lines because it is not directly part of the invention(s) and embodiments described herein.

Manufacturing

All manufacturing of the mount system 100 is achieved using one machine, no other setups it, no handing it off. A manufacturer can complete the entire mount system 100 all at once. Then, mark a little engraved line located so that when laser engraving, achieving some sort of indication of what's the top. Otherwise its necessary to bring it in the mill-turn machine and then find where is this sitting level? Where is the actual top? Where is the true center? how far front to back? All this uncertainty can be avoided by manually engraving a mark and then come back and laser-mark it so one can line up with degree-markings on the bottom of the rectangular base 104.

A mill turn machine does turning and milling on one machine and also enhances the part off one side. Thus, the mill-turn machines acts as a type of lathe with live tooling.

Disclaimer

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of manufacturing a mount system, comprising:
   fabricating a rectangular base with a two-sided center aperture;
   fabricating a lower swivel with a circular bottom fitted to be located within an upper side of the center aperture;
   fabricating a disc-shaped puck to fit within a lower side of the center aperture;
   fabricating the lower swivel to have a conical-shaped tapered aperture in a vertical side; and
   fabricating an upper swivel to have a conical-shaped tapered protrusion that matches with the conical-shaped tapered aperture in the lower swivel.

2. The method of claim 1, further comprising:
   the conical-shaped tapered aperture correspond in size, shape, and taper-angle with the conical-shaped tapered protrusion within the upper swivel.

3. The method of claim 1, further comprising:
   configuring two vertical screws for engaging the lower swivel into the rectangular base through the puck; thereby
   maximizing a vertical fastening strength of the overall mount system.

4. The method of claim 3, further comprising:
   configuring the circular aperture to have a flat shelf surface for absorbing a vertical pressure from the two vertical screws, thereby assisting in effective fastening.

5. The method of claim 1, further comprising:
   fastening the lower swivel to the rectangular base using the puck.

6. The method of claim 4, further comprising:
   a tapered-head screw fastening the upper swivel to the lower swivel thereby matching the tapered aperture with the conical protrusion.

7. The method of claim 6, further comprising:
   positioning the taper-headed screw to be in-place but not fully tightened; and
   configuring the upper and lower swivels such that during rotation of the upper swivel within the lower swivel, the upper swivel remains attached but with sufficient resistance to be movable but remaining in-position.

8. The method of claim 7, further comprising:
   manufacturing the rectangular base, puck, and lower and upper swivels from aluminum.

9. The method of claim 1, further comprising:
   configuring the puck to maximize thread-count yet still form a flat bottom when combined with and fitted within the rectangular base.

10. The method of claim 9, further comprising:
    configuring the center aperture within the rectangular base to have an inside surface groove for housing an O-Ring.

11. The method of claim 10, further comprising:
    locating the O-Ring within the inside surface groove of the circular aperture; thereby
    creating sufficient resistance during rotation of the conical tapered protrusion such that a user will have sufficient resistance to make adjustments to the mount system.

12. The method of claim 10, further comprising:
    configuring the rectangular base to have visible numbering and degree-markings from zero to 90 degrees with a visible mark every 10 degrees.

13. The method of claim 12, further comprising:
    achieving the numbering and degree-markings by anodizing the rectangular base.

14. The method of claim 10, further comprising:
    configuring the upper swivel to have visible numbering and degree-markings from zero to 90 degrees with a visible mark every 10 degrees.

15. The method of claim 14, further comprising:
    achieving the numbering and degree-markings by anodizing the upper swivel.

16. The method of claim 10, further comprising:
    configuring the upper swivel to rotate in about a lateral axis.

17. The method of claim 16, further comprising:
    configuring the lower swivel to rotate about a vertical axis.

18. The method of claim 17, further comprising:
    manufacturing the mount system to have two separate degrees of freedom over two separate rotation-paths, each having 360 degrees of rotation.

19. The method of claim 18, further comprising:
    manufacturing the mount system to have zero-offset from a horizontal axis and lateral axis of the rectangular base; thereby
    assuring that a center of rotation of the lower swivel is also a center of tilting of the upper swivel.

20. The method of claim 17, further comprising:
    during a fabrication and testing phase, running the mount system within an environmental test chamber in temperature-varying and humidity-varying environments.

* * * * *